United States Patent
Mund et al.

(10) Patent No.: US 6,306,533 B1
(45) Date of Patent: Oct. 23, 2001

(54) COOLING SYSTEM FOR A FUEL CELL BATTERY

(75) Inventors: Konrad Mund, Uttenreuth; Rittmar von Helmolt, Erlangen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/319,891

(22) PCT Filed: Dec. 11, 1997

(86) PCT No.: PCT/DE97/02891

§ 371 Date: Jun. 14, 1999

§ 102(e) Date: Jun. 14, 1999

(87) PCT Pub. No.: WO98/26464

PCT Pub. Date: Jun. 18, 1998

(30) Foreign Application Priority Data

Dec. 13, 1996 (DE) .............................. 196 52 005

(51) Int. Cl.[7] ........................................ H01O 8/04
(52) U.S. Cl. ................................. 429/26; 429/37
(58) Field of Search ......................... 429/26, 37

(56) References Cited

U.S. PATENT DOCUMENTS

| | | | |
|---|---|---|---|
| 3,880,670 | * 4/1975 | Shinn | 429/26 |
| 3,945,849 | * 3/1976 | Nickols | 429/26 |
| 4,582,765 | * 4/1986 | Kothmann | 429/26 X |
| 4,678,724 | * 7/1987 | McElroy | 429/26 X |
| 4,826,741 | 5/1989 | Aldhart et al. | 429/19 |
| 4,839,247 | 6/1989 | Levy et al. | 429/21 |
| 4,956,245 | * 9/1990 | Shimizu et al. | 429/26 |
| 4,978,589 | * 12/1990 | Shiozawa et al. | 429/26 |
| 5,230,966 | 7/1993 | Voss et al. | 429/26 |
| 5,686,197 | * 11/1997 | Nishida et al. | 429/26 |
| 5,686,200 | * 11/1997 | Parton et al. | 429/37 |
| 6,087,033 | * 7/2000 | Grüne et al. | 429/37 |

FOREIGN PATENT DOCUMENTS

| | | |
|---|---|---|
| 39 03 261 C2 | 2/1989 | (DE) . |
| 39 07 819 A1 | 3/1989 | (DE) . |
| 43 14 745 C1 | 5/1993 | (DE) . |
| 44 42 285 C1 | 11/1994 | (DE) . |
| 195 23 317 A1 | 6/1995 | (DE) . |

OTHER PUBLICATIONS

Patent Abstracts of Japan Application No. 61272901 dated Nov. 18, 1986. (Published 6/88)
Patent Abstracts of Japan Application No. 59238112 dated Nov. 12, 1984. (Published 6/86)

* cited by examiner

Primary Examiner—Stephen Kalafut
(74) Attorney, Agent, or Firm—Schiff Hardin & Waite

(57) ABSTRACT

A cooling system for a battery of fuel cells that contains at least two fuel cells, each of which comprises a membrane-electrode unit and two collector plates is disclosed. Cooling cards supplied with coolant and that are connected to one another via lines are thereby arranged between the individual fuel cell units.

16 Claims, 2 Drawing Sheets

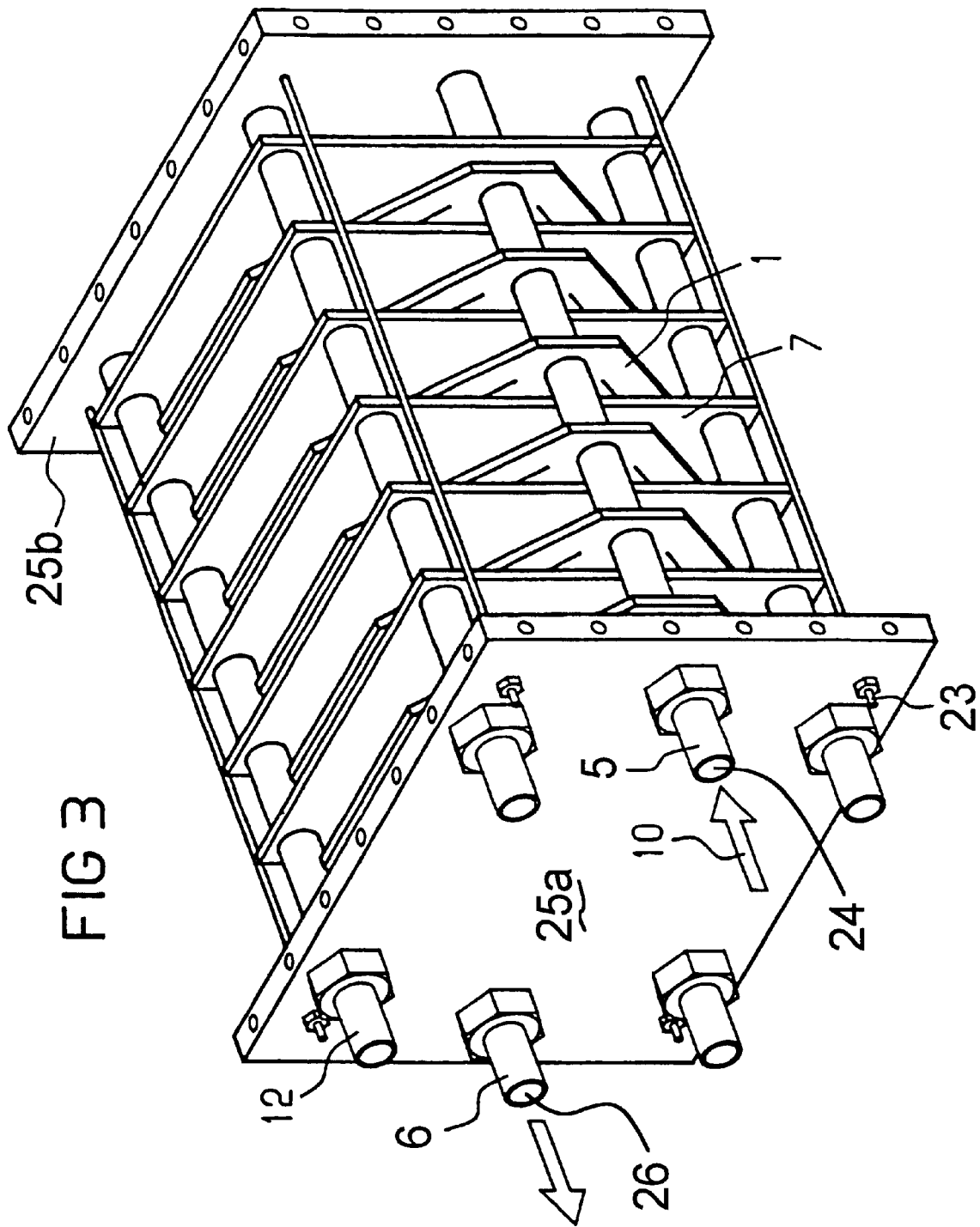

COOLING SYSTEM FOR A FUEL CELL BATTERY

FIELD OF THE INVENTION

The invention is directed to a novel cooling system for a battery of fuel cells that contains at least two fuel cells, each of which comprises a membrane-electrode unit and two collector plates.

BACKGROUND OF THE INVENTION

Up to now, fuel cell batteries with cooling systems are known wherein coolants flow in bipolar plates that are located between the individual fuel cell units of a battery. In addition, newer cooling systems have been disclosed for these batteries that are cooled without bipolar plates or filter press technology in a gas or in a fluid bath (see, e.g. German Letters Patent 44 42 285) and comprise fuel cell units that can be individually handled within the battery.

Sealing problems particularly arise in the battery cooling with bipolar plates because regions lie next to one another in which oxidant and fuel, which must be dependably sealed off from one another, are conducted. Given the fuel cell batteries without bipolar plates, which have only been known for a short time (see, e.g. German Letters Patent 44 42 285), fundamentally only two cooling systems have hitherto been known that both have the coolant flow through the battery in a free stream.

Under certain circumstances, however, the problem of uniform distribution and flow-through of the coolant within the fuel cell battery arises in the concept of fluid cooling because the areas close to inlet and discharge openings of the battery have a more intense flow and are thus more intensively cooled than the other areas of the battery. It can also be disadvantageous that many component parts of the battery enter into communication with the coolant—especially when coolants that are incompatible with the materials of the fuel cells are employed.

The full content of the patent bearing serial number German Letters Patent 44 42 285 is herewith referenced and the entire disclosure thereof is incorporated by reference into the subject matter of the present specification.

There is a need for economical batteries of fuel cells, i.e. batteries constructed without bipolar plates, wherein the cooling system assures an optimally uniform distribution of the coolant within the battery. There is also a need in fuel cell batteries with bipolar plates for a cooling capacity that can be added in when the battery must temporarily yield greater powers.

SUMMARY OF THE INVENTION

It is therefore an object of the present invention to make a cooling system for a fuel cell battery, particularly a PEM fuel cell battery, available that assures an optimally uniform flow-through of a fuel cell battery with coolant and/or that can be added in as needed to an existing cooling.

The subject matter of the present invention is therefore a battery and a method for the manufacture of a battery composed of at least two fuel cells each of which comprises a membrane-electrode unit and two collector plates, whereby a cooling card that has thermal contact to at least one of the neighboring fuel cells is located between the fuel cells.

In one embodiment of the invention, the individual cooling cards of a battery are connected by conduits in which coolant is conveyed. Electrically, however, the cooling cards are insulated from one another. It is cost-beneficial when the cooling cards of a battery (or of a plurality of batteries) are connected to one another but when they are also connected to an external heat exchanger that serves for regeneration of the coolant and that, for example, can also be fashioned in the form of a heat engine.

In one embodiment, the cooling card is filled such with endothermically reacting medium that exhaust gases of the endothermic reaction can escape via the sealing frame element (for example, alcohol), and enough cooling capacity is contained in a cooling card for the operating duration of the battery that no supply or disposal line of the cooling card are required.

In a practical development of the invention, the cooling cards themselves can be simply and cost-beneficially manufactured because they can be assembled by simple scaling and/or clamping and/or plugging of two coined plates.

In another advantageous development, the cooling cards are joined to the respectively adjacent collector plates of the adjoining fuel cells by and adhesive that is thermally and/or electrically conductive. In yet another embodiment, the cooling cards can be inserted as needed into the bipolar plates. Finally, the cooling cards of another embodiment of the invention can be respectively integrated in an intermediate element that is located between the collector plates of the individual fuel cells. Any element that serves for

- transmission of the mechanical pressure between the individual fuel cells,
- transmission of the electrical current between the individual fuel cells, and
- elimination of the dissipated heat from the collector plate within a fuel cell battery is suited as intermediate element. For example, the intermediate element disclosed in the patent application bearing the German serial number 196 359 0.5 (of the same assignee) is especially well-suited.

What is understood here by "battery" is a unit or stack of at least two series-connected fuel cells. Dependent on the application of the fuel cell battery (stationary fields of employment of the PEM batteries are, for example, the applications in household energy supply and in decentralized power generating; electro-traction is a mobile application), practice will be a matter of units having a far greater number of individual, series-connected fuel cells.

Fuel cells that were disclosed by German Letters Patent 44 42 285 already cited above are preferably referred to here as "individual fuel cell" or "fuel cell unit". Said fuel cells are not limited to the PEM fuel cells (see column 3, lines 18–27 of the German Patent) and are individually handled units that respectively comprise a negative pole plate, a membrane-electrode unit and a positive pole plate, whereby the aforementioned component parts are connected to one another by a frame element in a mechanically rigid, gas-tight and electronically insulating fashion. The invention, however, is not limited to batteries of these fuel cells but, as already mentioned, also covers batteries that are manufactured with the filter press technology upon employment of bipolar plates.

In the present case, the term "membrane-electrode unit" is used in its sense familiar to a person skilled in the art, as explained in the book "Brennstoffzellen", edited by Ledjeff, and published by Müller Verlag or in the patent specifications that have been cited.

What is referred to here as "collector or contact plate" is every terminating plate of a fuel cell unit of the battery. This can thereby be a matter both of traditional "bipolar plates" or "bipolar plates" wherein two collector plates are combined to form bipolar plate as well as individual pole plates as disclosed, for example, by German Letters Patent 44 42 285. Among other things, traditional bipolar plates are described in the book "Brennstoffzellen" edited by Ledjeff.

What is understood by "cooling card" is every type of a welded or otherwise fashioned plate that forms a cavity for the coolant. For example, these are a matter of double plates that lie on top of one another and are joined to one another in sealing fashion along the edges. The cooling cards can contain openings for the acceptance and discharge of coolant that are surrounded such with seal elements or sealing lips that, by simply stacking the cooling cards, lines through which the coolant can flow are formed between them.

The cavities in the individual cooling cards of a fuel cell battery or of a plurality of batteries can be connected to one another via lines. These lines can be connected to any type of cooling circulation system, whereby the fashioning of the cooling circulation system is in turn completely arbitrary, for example can be fashioned from heat engine to simple beaters. The material of the plates that, together with the seal elements, form the cooling card must be electrically and thermally conductive material and should exhibit enough elasticity so that it can also be practically employed for the transmission of the mechanical pressure in the battery and component tolerances are compensated. For example, stainless steel or spring bronze or other copper or aluminum alloys as well as plastics, for example metal-containing polymers, are suitable. A surface treatment of the plates (for example, gold plating), which can also protect against corrosion, can ensue for reducing the contact resistance and for better heat elimination to the coolant. Such a surface treatment can be meaningful not only for the cooling cards but also for other elements of an inventive battery.

What are understood by "lines" in the sense of the present invention are, first, lines that are formed by the assembly of the discrete elements of a PEM fuel cell battery without additional line parts. However, the inventive lines can just as easily be composed and constructed of finished line parts such as tubes or hoses that are integrated into the battery. All conceivable lines and line arrangements for coolants are co-covered by the present invention.

The thickness of the individual plates can vary. It preferably amounts to between 0.001 mm and 1 mm, particularly preferably between 0.01 mm and 0.4 mm and, in particular, between 0.05 mm and 0.2 mm.

The manufacture of the cooling cards should be optimally cost-beneficial and simple, for example be sealing clamps and plugging two pre-coined plates together upon employment of a seal element, which is preferably elastic. For improved thermal and/or electrical conductivity of the cooling cards to the respectively adjoining collector plates, it can be meaningful to utilize electrical and/or thermally conductive adhesives. For example, the entire active surface of the cooling card as well as the cell surface of the adjacent collector plate are covered with such adhesive (either on one or both sides) and are then pressed against one another. Of course, only individual points or lines of the surfaces can also be connected via such adhesive layers. The manufacture of the cooling cards can also ensue by simply welding or soldering the double plates together. Any practical manufacture of cooling cards, whether produced single part or multi-part or whether by soldering, gluing, welding or in some other way is co-covered by the invention.

What is understood be "coolant" is a liquid (for example, water, alcohol, oil) or a gas (for example, an endothermically reacting gas mixture that gets the heat for a continuously occurring process from the waste heat of the fuel cell).

The cooling cards can replace intermediate elements as disclosed, for example, in the German Patent Application bearing serial number 196 359 01.5 and that serve within the battery for the transmission of the electrical power, mechanical pressure and for heat transmission or elimination. On the other hand, the intermediate element can also be retained in modified form, whereby the cooling card is either integrated into the intermediate element or is joined to it by an electrically and thermally conductive adhesive or other connections that are electrically and thermally conductive. For example, a connection of cooling card and/or intermediate element to the collector plate by soldering or welding is conceivable as long as it is assured that the mechanical pressure, the current and the waste heat can be conducted via these connector parts.

In an embodiment, the present invention comprises a battery comprising at least two fuel cell units, each fuel cell unit comprising a membrane-electrode unit disposed between two collector plates, the battery further comprising at least one cooling card disposed between two fuel cells and in thermal contact to one of the collector plates of each of said two fuel cells, the cooling card comprising a chamber for accommodating coolant, the chamber being connected to an input line and an output line for circulating coolant through the cooling card, the fuel cells being disposed between the input and output lines.

In an embodiment, the cooling card is in electrical contact with said two fuel cells.

In an embodiment, the input and output lines are connected to a heat exchanger.

In an embodiment, the cooling card comprises two opposing plates with the chamber disposed therebetween, each plate having an outer periphery joined to the outer periphery of the other plate by at least one sealing clamp.

In an embodiment, the cooling card is connected to the collector plates of said two fuel cells by a thermally conductive adhesive.

In an embodiment, the cooling card is connected to the collector plates by an adhesive that is thermally and electrically conductive.

In an embodiment, the battery further comprises a bipolar plate and the cooling card is mounted in the bipolar plate.

In an embodiment, the present invention comprises a method of manufacturing a fuel cell battery comprising the steps of providing at least two fuel cell units, each fuel cell unit comprising a membrane-electrode unit disposed between two collector plates, providing at least one cooling card comprising a chamber for accommodating coolant, the chamber being connected to an input line and an output line for circulating coolant through the cooling card, placing the cooling card between the two fuel cell units with the fuel cell units being disposed between the input and output lines, connecting the cooling card to the two fuel cell units with an adhesive.

In an embodiment, the adhesive is thermally conductive.

In an embodiment, the adhesive is electrically conductive.

In an embodiment, the adhesive is electrically and thermally conductive.

In an embodiment, the present invention comprises a battery comprising at least two fuel cell units, each fuel cell unit comprising a membrane-electrode unit disposed between two collector plates, the battery further comprising at least one cooling card disposed between two fuel cells and in contact to one of the collector plates of each of said two fuel cells, the cooling card comprising a chamber for accommodating coolant, the chamber being connected to an input line and an output line for circulating coolant through the cooling card, the fuel cells being disposed between the input and output lines and extending perpendicularly between the input and output lines, the fuel cells and cooling card being disposed parallel to one another and in a stacked configuration.

Other objects and advantages of the present invention will become apparent from reading the following detailed description and appended claims, and upon reference to the accompanying drawings.

BRIEF DESCRIPTION OF THE DRAWINGS

The invention is illustrated below with reference to three Figures, wherein

FIG. 2 is a sectional view of the two most common types of cooling cards whereby

FIG. 3 is a perspective view of an inventive battery with six fuel cell units, a front and a back cover plate as well as a screwed connection with tie rod.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
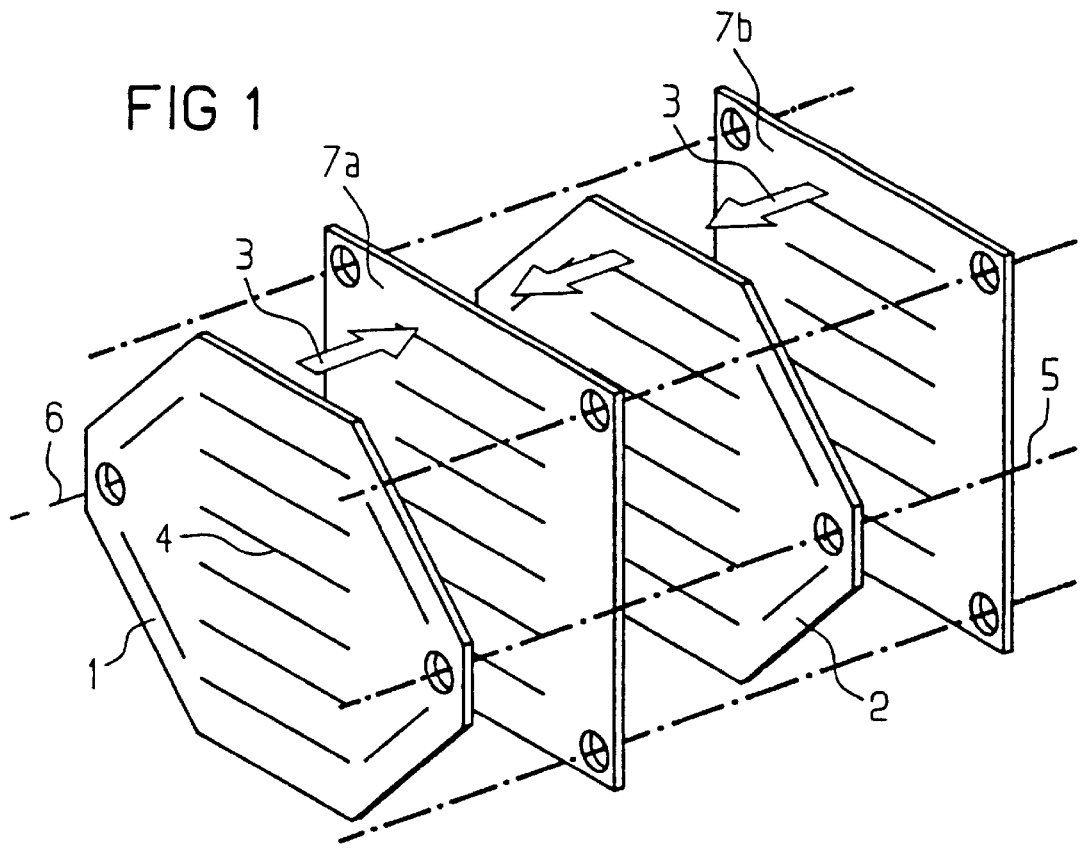
FIG. 1 is an exploded perspective view of an embodiment of an inventive battery wherein respectively two fuel cell units and two cooling cards can be schematically recognized.

FIG. 1 shows four individual parts that are assembled along the arrows 3 for a functional battery. A first cooling card 1 can be seen at the very front, this comprising two through openings that are connected to the corresponding openings of the second cooling card 2 via lines 5 and 6. The octagonal shape of the cooling card shows a preferred embodiment but the shape and number of corners of the cooling cards are not intended to limit the scope of the invention. On the contrary, every possible shape of the cooling cards, i.e. a round or curved design as well, is included in the invention. So that the cooling card experiences a uniform flow-through with coolant, the cooling cards 1 and 2 indicated here by way of example comprise transverse channels 4 that are schematically indicated by the longitudinal lines 4. The broken line 5 shows how the two cooling cards 1 and 2 are connected by lines. These lines are preferably axial channels that are compounded like the remaining channels of the fuel cell battery, for example the fuel and oxidant delivery and discharge channels. The coolant is conducted in these lines. For example, the fresh coolant is conveyed to the cooling cards in the right-hand line 5 and—after being used—is in turn carried off through the left-hand line 6. The first fuel cell unit 7a is located behind the cooling card 1, the four axial delivery and disposal channels and the distribution channels along the cell surface again being visible thereat.

When assembling the battery along the arrows 3, seal elements must also be inserted at the respective lines at their interface to the cooling cards or fuel cells in addition to the lines that, on the one hand, connect the fuel cell units to one another and, on the other hand, connect the cooling cards to one another. These seal elements can also already be integrated in the fuel cell units or the cooling cards, as was already proposed (see German Letters Patent 44 42 285) for the fuel cell units, so that further component parts are not necessary. During assembly, however, care must be exercised to see that the cooling cards have no electrical contact with one another since the intervening cooling cards would otherwise be shorted. The seals are generally a matter of elastic seal material as traditionally used in fuel cell batteries. The plurality of lines and axial channels that connect the individual systems to one another are, of course, only an example, and it is definitely conceivable that the cooling cards, for example, are connected to one another with more than two lines.

Figure 2A:
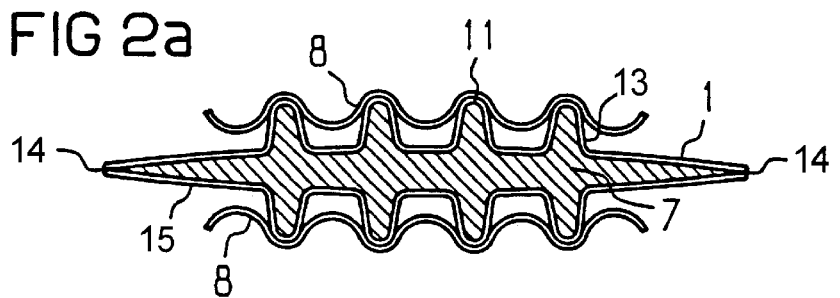
FIG. 2a shows a cooling card joined by soldering or welding and FIG. 2b shows a cooling card joined by sealing clamps in crossection.
Figure 2B:
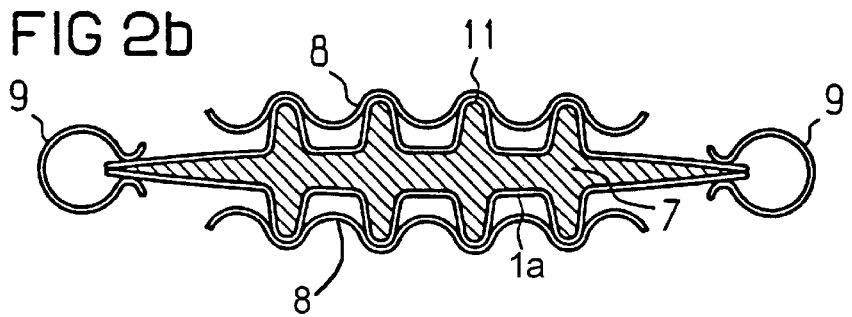

FIG. 2 is divided into two sub-sections, namely FIG. 2a and FIG. 2b. The middle of FIG. 2a shows an inventive cooling card 1 that is respectively welded at its corners 14. The upper sub-section 13 of the double plate, which forms the cooling card 1 in the present exemplary embodiment of the invention, and the lower sub-section 15 can be clearly seen. As stated, the two individual plates 13 and 15 are, for example, pre-coined plates for simple manufacture that are held together in sealing fashion at the edges 14, for example by soldering, welding or gluing. The openings with which the cooling cards are connected to one another cannot be seen because the crossection shown here proceeds parallel to these openings. The hatching indicates the coolant 7 that experiences a uniform distribution within the cooling card due to the design of the cooling card, with forces a specific flow on the medium.

A collector plate 8 is located respectively at the top and bottom following the cooling card, these collector plates 8 serving as housing of the fuel cell, for guiding the medium and for the support of the electrolyte. Just like the cooling cards, the collector plates 8 are connected to one another and must likewise be electrically conductive. The electrical line or series circuit of the collector plates dare also not be interrupted by the cooling cards. If the cooling cards have electrical contact to the neighboring fuel cells, it is obvious that, for example given the embodiment of the cooling card according to 2b wherein the cooling card is formed by the sealing clamping of two elements, that an electrically conductive connection of one collector plate to the next collector plate must be assured via the cooling card either by contact within the card 1a or via the scaling clamps 9. In an inventive battery, a fuel cell unit (membrane-electrode unit), which has not been shown here, is located between the two collector or contact plates 8 of FIGS. 2a and 2b. The at least thermal and potentially electrical and/or mechanical contact as well of the cooling card with the adjacent collector plate of the collector plate of the neighboring fuel cell exists along the surfaces 11 at which the collector plates abut the cooling cards. These surfaces are either formed in that the two parts, i.e. collector plate on the one hand and cooling card on the other hand, are mechanically pressed against one another (whereby, for example, the tie rods at the end plates of the finished battery generate an adequate mechanical pressure) or they are formed by an adhesive that is applied between these parts and at least thermally and potentially also electrically conductively connects these parts. The embodiment is especially beneficial wherein the contact is initially produced via the mechanical pressure and is then reinforced with the thermally and potentially also electrically conductive adhesive. An improvement of the thermal and electrical conductivity of these contact surfaces can also be achieved by employing an adhesive. For example, the manufacture, i.e. assembly, of a fuel cell battery can likewise be greatly simplified by glued connections. In an especially preferred embodiment, the manufacture of the cooling cards via sealing clamps as shown in FIG. 2b can ensue via the same clamp system as disclosed, for example, in German Letters Patent 44 42 285. The employment of the same clamping would thereby have to be able to further reduce the manufacturing costs of a finished fuel cell battery. A lock-seam process as employed in the manufacture of preserve and beverage cans is also conceivable.

FIG. 3 shows a cell stack of an inventive battery with end plates and tie rods. As in the air cooled version (see German Letters Patent 44 42 285), the individual cells are functional and leakage point allows reaction gas to emerge only into the outer space and to the ambient air. Malfunctioning cells can thus be individually detected and replaced. A cooling card 1 respectively resides between two cells or fuel cell units, and the individual cooling cards are connected to one another via lines 5 and 6. According to the preferred embodiment, a seal element or the one sealing lip that surrounds the opening of the first cooling card presses such—due to the stacking—onto the other sealing lip or the other seal element with tie rods that comprises the lines 5, 6. The supply of the individual fuel cell units 7 as well as of the individual cooling cards with one another ensues via lines that respectively have an admission and a discharge connected to the end plates 25a, 25b of the battery. The admission opening 24 through which the coolant 10 proceeds into the line 5 that connects the individual cooling cards, as described above, can be seen at the end plate 25a. The opening 26 through which the used coolant that is transported out of the line 6 (FIG. 1) in turn leaves the fuel cell stack or the battery and, for example, is supplied to a regeneration in an heat exchanger or some other regeneration system is shown only as discharge opening at the same level. Reaction gases are supplied to and removed from the individual cells 7 via four channels, whereby the admission and discharge openings can be seen, for example, as opening 12 at the end plate 25a. The tie rods 23 with which the entire battery is held together can likewise be seen at the end plate 25a.

The geometrical shapes cited by way of example and the schematically illustrated drawings in fact represent preferred embodiments of the invention but are not intended to limit the scope of the invention in any way whatsoever. The area of employment of such fuel cell batteries is broad and extends from electro-traction up to stationary employment in the higher kilowatt range.

From the above description, it is apparent that the objects of the present invention have been achieved. While only certain embodiments have been set forth alternative embodiments and various modifications will be apparent from the above description to those skilled in the art. These and other alternatives are considered equivalents and within the spirit and scope of the present invention.

What is claimed is:

1. A battery comprising:
    at least two fuel cell units, each fuel cell unit comprising a membrane-electrode unit disposed between two collector plates and having a bipolar plate,
    the battery further comprising at least one cooling card being mounted in the bipolar plate between two fuel cells and in thermal contact to one of the collector plates of each of said two fuel cells,
    the cooling card comprising a chamber for accommodating coolant, the chamber being connected to an input line and an output line for circulating coolant through the cooling card,
    the fuel cells being disposed between the input and output lines.

2. The battery of claim 1 wherein the cooling card is in electrical contact with said two fuel cells.

3. The battery of claim 1 wherein the input and output lines are connected to a heat exchanger.

4. The battery of claim 1 wherein the cooling card comprises two opposing plates with the chamber disposed therebetween, each plate having an outer periphery joined to the outer periphery of the other plate by at least one sealing clamp.

5. The battery of claim 1 wherein the cooling card is connected to the collector plates of said two fuel cells by a thermally conductive adhesive.

6. The battery of claim 1 wherein the cooling card is connected to the collector plates by an adhesive that is thermally and electrically conductive.

7. A method of manufacturing a fuel cell battery comprising the steps of:
    providing at least two fuel cell units, each fuel cell unit comprising a membrane-electrode unit disposed between two collector plates and having a bipolar plate,
    providing at least one cooling card comprising a chamber for accommodating coolant, the chamber being connected to an input line and an output line for circulating coolant through the cooling card, placing the cooling card between the two fuel cell units with the fuel cell units being mounted in the bipolar plate and between the input and output lines, connecting the cooling card to the two fuel cell units with an adhesive.

8. The method of claim 7 wherein the adhesive is thermally conductive.

9. The method of claim 7 wherein the adhesive is electrically conductive.

10. The method of claim 7 wherein the adhesive is electrically and thermally conductive.

11. A battery comprising:

at least two fuel cell units, each fuel cell unit comprising a membrane-electrode unit disposed between two collector plates and having a bipolar plate, the battery further comprising at least one cooling card being mounted in the bipolar plate between two fuel cells and in contact to one of the collector plates of each of said two fuel cells, the cooling card comprising a chamber for accommodating coolant, the chamber being connected to an input line and an output line for circulating coolant through the cooling card, the fuel cells being disposed between the input and output lines and extending perpendicularly between the input and output lines, the fuel cells and cooling card being disposed parallel to one another and in a stacked configuration.

12. The battery of claim 11 wherein the cooling card is in electrical contact with said two fuel cells.

13. The battery of claim 11 wherein the input and output lines are connected to a heat exchanger.

14. The battery of claim 11 wherein the cooling card comprises two opposing plates with the chamber disposed therebetween, each plate having an outer periphery joined to the outer periphery of the other plate by at least one sealing clamp.

15. The battery of claim 11 wherein the cooling card is connected to the collector plates of said two fuel cells by a thermally conductive adhesive.

16. The battery of claim 11 wherein the cooling card is connected to the collector plates by an adhesive that is thermally and electrically conductive.

* * * * *